June 30, 1959
R. A. McCALLUM
2,892,532
STRAND SUPPORTED BELT CONVEYOR WITH TENSION
DETERMINING MEANS FOR THE SUPPORT STRANDS
Filed July 15, 1957
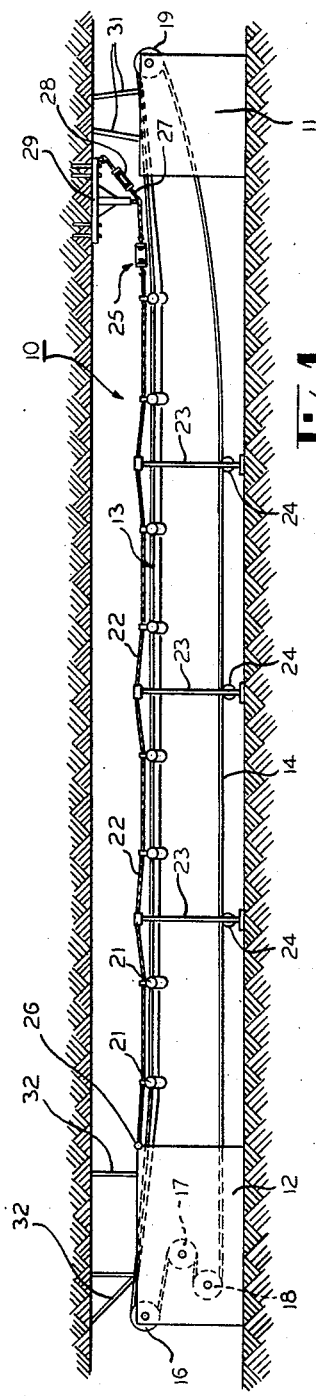
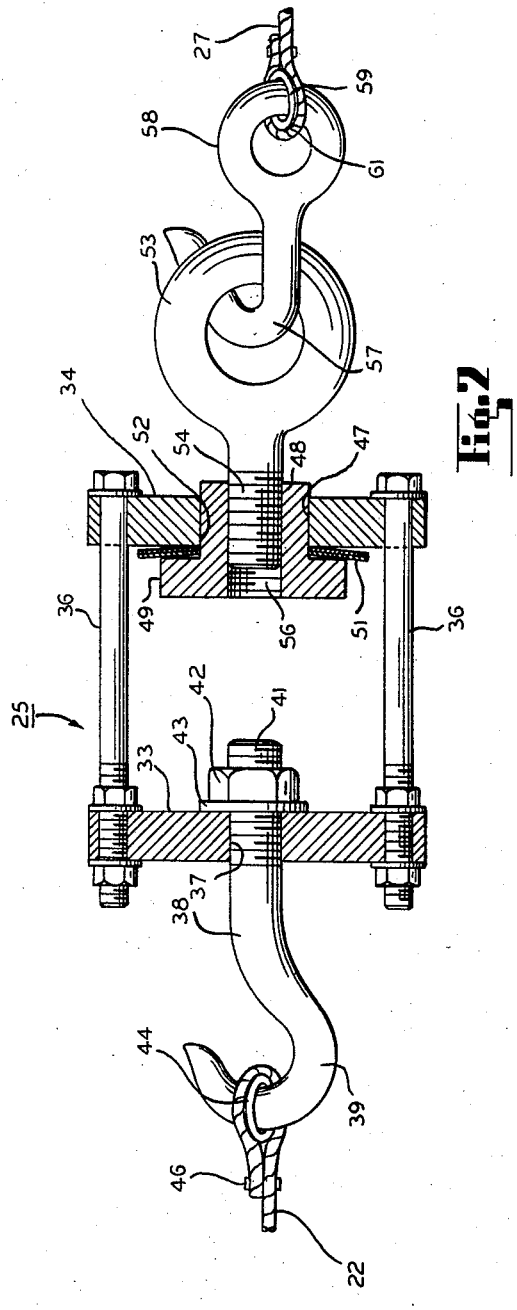
INVENTOR.
ROBERT A. McCALLUM
BY
Murray A. Gleeson
ATTORNEY

United States Patent Office 2,892,532
Patented June 30, 1959

2,892,532

STRAND SUPPORTED BELT CONVEYOR WITH TENSION DETERMINING MEANS FOR THE SUPPORT STRANDS

Robert A. McCallum, Clarendon Hills, Ill., assignor to Goodman Manufacturing Company, Chicago, Ill., a corporation of Illinois Application July 15, 1957, Serial No. 671,820

1 Claim. (Cl. 198—184)

This invention relates generally to belt conveyors of the type supported upon flexible strands, and more particularly to improvements in devices for readily adjusting the tension of the support strands to a desired value.

In Craggs et al. Patent No. 2,773,257, issued December 4, 1956, for Conveyor Having Flexible Strand Side Frames and Troughing Roller Assembly Therefor, the conveying reach of the endless belt is supported upon spaced cables, the load on the conveying reach being transferred into the cables by means of troughing roller assemblies suspended therefrom. The cables in turn are supported upon standards having idler assemblies for supporting the return reach of the endless belt. In such a conveyor the support strands or cables must be given an initial tension so as to provide proper support for the conveying reach, but such tension must be held below a certain limit in order to give what is known as "rope-action" of the support cables when the conveying reach is loaded.

With the foregoing considerations in mind it is a principal object of this invention to provide a simple construction whereby the support cables can be stressed to a predetermined correct value.

Another object is to provide for pre-stressing of the support cables of an endless belt conveyor of the type disclosed in the aforesaid Craggs et al. patent, the proper stressing being effected by the adjustment nut or turnbuckle bearing against a pre-stressed spring disk, the proper stress being determined by observing the action of the disk.

Other objects and important features of the invention will be apparent from a study of the specification following taken with the drawing, which together describe and illustrate a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claim.

In the drawing:

Fig. 1 is a side elevation view of an endless belt conveyor having the improvement according to the present invention embodied therein; and and Fig. 2 is a longitudinal sectional view, certain parts being shown in elevation, of a support cable tension limiting device according to the present invention.

Referring now to the drawing, the improvements according to the present invention are embodied in an endless conveyor indicated generally by the reference numeral 10, said conveyor including a tail section 11 and a head section 12. An endless belt having a conveying reach 13 and a return reach 14 is reeved for orbital movement between the end sections 11 and 12, the endless belt being reversed in direction about an idler pulley 16 at the head section 12 and driven thereat by snubbing driving pulleys 17 and 18. A motor, not shown, at head section 12 drives pulleys 17 and 18. The endless belt is reserved in direction about an idler pulley 19 at the tail section 11.

The conveying reach 13 is supported by troughing roller assemblies indicated generally by the reference numeral 21, said troughing roller assemblies being suspended across a pair of laterally spaced flexible support strands 22. The load on the conveying reach 13 is thus transmitted into the support strands 22 and in turn upon standards 23 disposed at intervals throughout the length of the support strands 22, each of the standards 23 having an idler pulley 24 for guiding and supporting the return reach 14.

Each of the support strands 22 is anchored as at 26 to the head section 12, and the inby end of each cable is connected to a tension adjusting means indicated generally by the reference numeral 25, it in turn being connected by a cable 27 to a turn buckle 28 at an anchoring assembly 29. Anchor assembly 29 may be of the type as may be disclosed in an application of Craggs et al. Serial No. 600,547, filed July 27, 1956, for Supports for Flexible Strand Conveyors. Alternately, the support strands 22 can be anchored to the tail section 11, the tension adjusting means 25 being interposed in each strand 22 preferably near such tail section 11.

The tail section 11 can be held in position by struts or roof jacks 31, and the head section 12 by struts or roof jacks 32.

Referring now to Fig. 2 of the drawing the tensioning means 25 consists of a pair of square abutment plates 33 and 34 held together as a unit by supporting corner bolt assemblies 36. Abutment plate 33 is drilled at 37 at the center thereof to receive the shank 38 of a hook 39. The shank 38 is threaded at 41 to receive a stop nut 42 bearing against a washer 43. The hook 39 is secured to the eye in the end of the cable or strand 22 which is fitted with a thimble 44 and a clamp 46.

Abutment plate 34 is drilled as at 47 to receive a gland 48 having an annular flange 49 which bears against spring disks 51, the spring disks being supported on the diameter 52 of the gland 48 and between flange 49 and plate 34. An eye bolt 53 has a threaded shank 54 in threading engagement with threads 56 of the gland 48. The eye bolt 48 is connected to a hook 57 having an eye 58, connected to the cable 27, it having a thimble 59 and an eye 61.

With the assembly thus far described in a position as seen in Fig. 1, the proper tension on the cables 22 can be adjusted by the turn buckle 28. The spring disks 51 are arranged to flatten when a load therein in excess of a predetermined amount is applied. Thus, the operator can stress the cable 28 by adjusting the turn buckle until the spring disks flatten, at which time the turnbuckle may be rotated in the opposite direction a few turns until the disks tend to resume a dished contour thereby more precisely determining the load applied to the ropes.

Each of the spring disks 51 can be calibrated so as to flatten at any predetermined load thereon, for example, of the order of 500 pounds. Two such spring disks, as shown, would then readily determine a usable stress in the cables of the order of 1000 pounds, a value which has been found satisfactory for most operating conditions.

While the invention has been described in terms of a preferred embodiment thereof its scope is intended to be limited only by the claim here appended.

I claim as my invention:

In an endless belt conveyor, a pair of laterally spaced support strands for the conveying reach of an endless belt, means for anchoring each end of said support strands, and means interposed in each strand for determining the maximum permissible tension in said strand for the unloaded condition of said conveyor comprising a pair of spaced abutments including means for maintaining said abutments in spaced relationship, a connection to a rope strand supported on one of said spaced abutments, an opening in the other of said spaced abutments, a member having a shank received in said opening, said shank having threads thereon, a connecting member to a rope strand threadably connected to said shank, a flange on said member, a deformable spring disk having a central opening therein received on said shank and between said flange and said other spaced abutment, said spring disk flattening between said flange and said other abutment when the tension in said strands exceeds a predetermined value.

References Cited in the file of this patent

UNITED STATES PATENTS

| | | |
|---|---|---|
| 2,464,152 | Ralston | Mar. 8, 1949 |
| 2,664,845 | Rhodes | Jan. 5, 1954 |
| 2,773,257 | Craggs | Dec. 4, 1956 |